Dec. 13, 1927.
A. E. BRONSON ET AL
ARMORED STEERING WHEEL
Filed Aug. 26, 1922
1,652,234
2 Sheets-Sheet 1
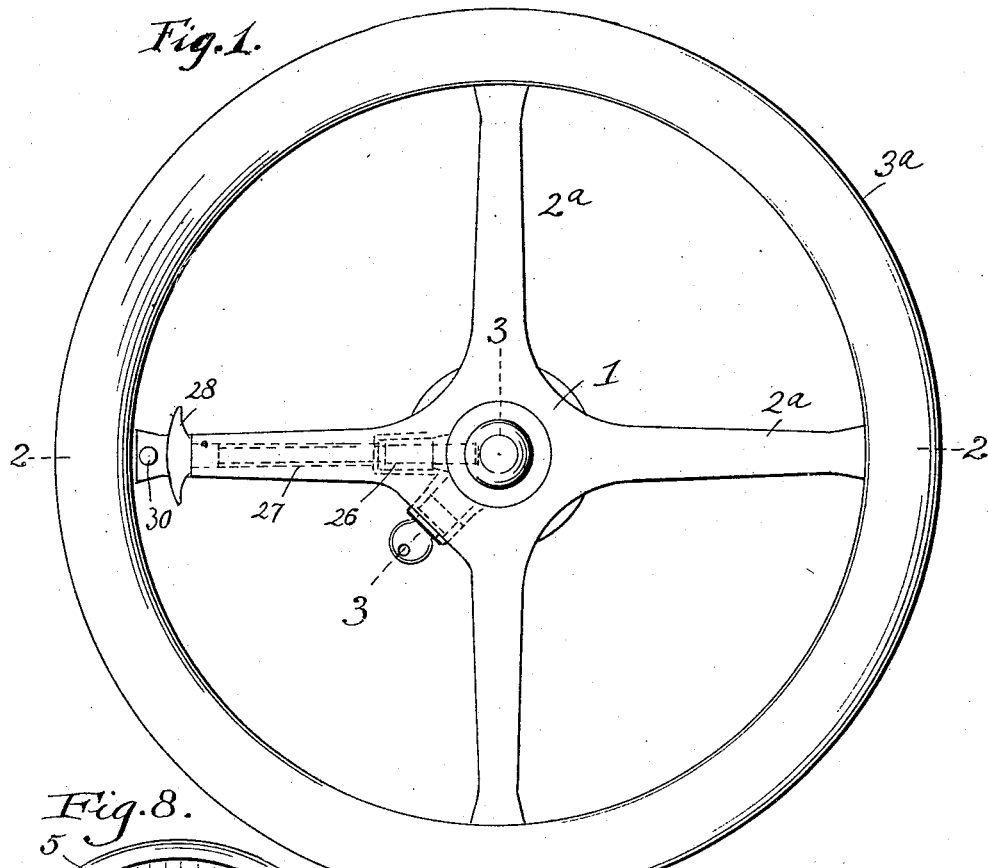
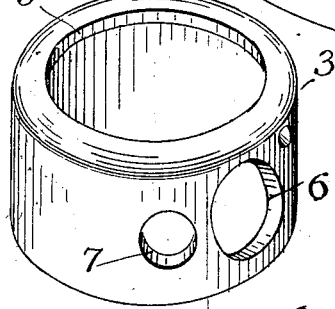
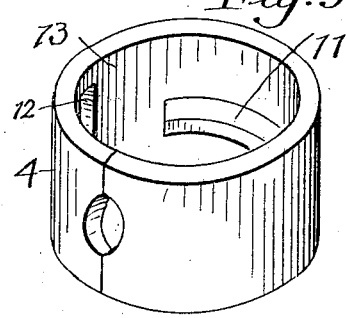
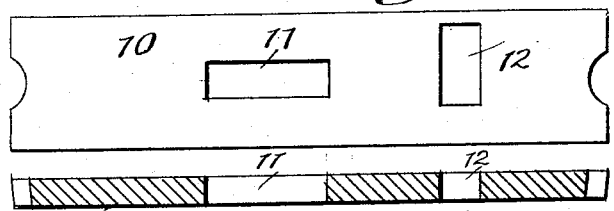
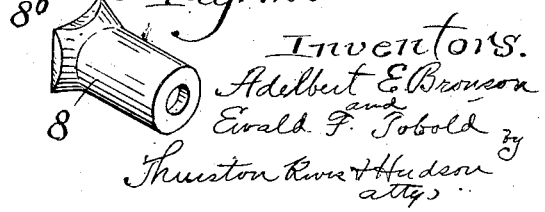

Dec. 13, 1927.
A. E. BRONSON ET AL
1,652,234
ARMORED STEERING WHEEL
Filed Aug. 26, 1922
2 Sheets-Sheet 2
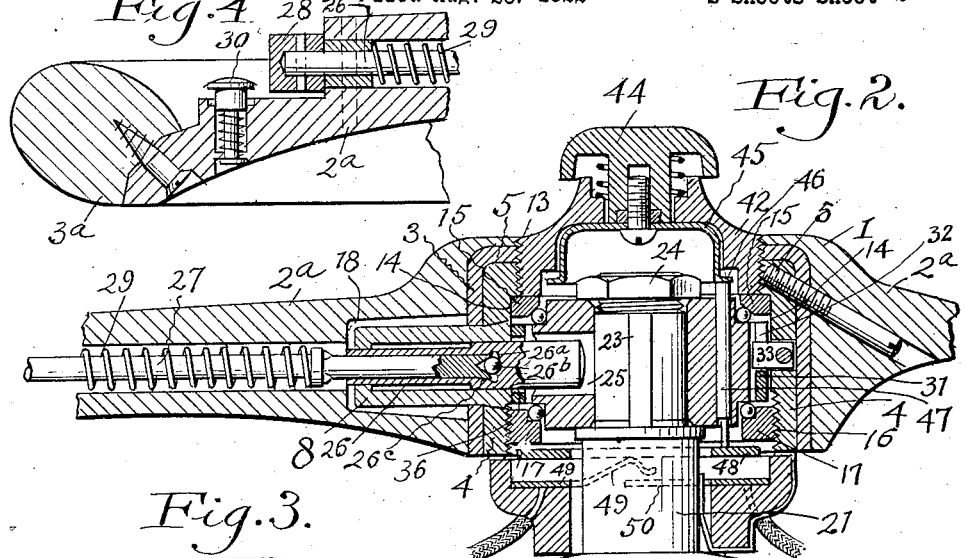
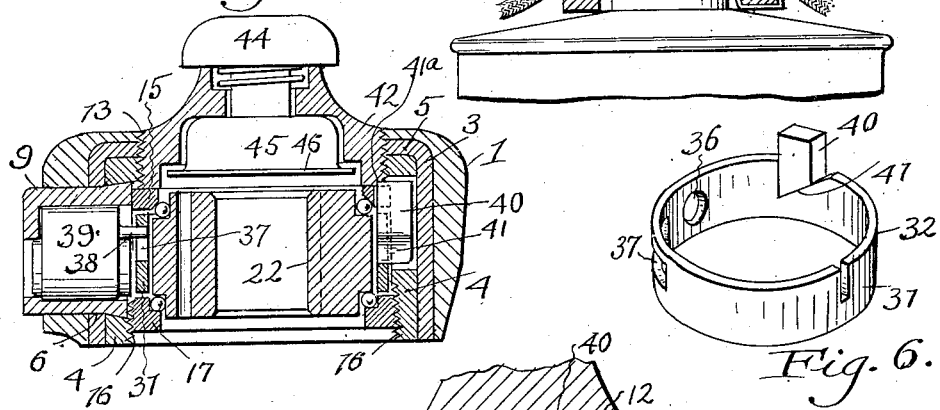

Patented Dec. 13, 1927.

1,652,234

UNITED STATES PATENT OFFICE.

ADELBERT E. BRONSON AND EWALD F. TOBOLD, OF CLEVELAND, OHIO, ASSIGNORS TO THE DILL MANUFACTURING COMPANY, OF CLEVELAND, OHIO, A CORPORATION OF OHIO.

ARMORED STEERING WHEEL.

Application filed August 26, 1922. Serial No. 584,407.

The present invention relates to a steering wheel construction which is particularly adapted for use in connection with a motor vehicle or any analogous structure, particularly that type of steering wheel which may be fastened or secured to the steering shaft or released therefrom at will, and when so released locked against renewed engagement between the wheel and the steering shaft, except upon the operation of a locking mechanism, so that when the operator leaves the motor vehicle the steering wheel may be released from its engagement with the steering post and maintained in this condition, thereby preventing the steering of the motor vehicle until the driving relationship between the steering wheel and steering post has been reestablished.

The particular invention which is herein set forth relates more particularly to a construction for providing an encasing armor for the mechanism by which the driving relationship between the steering wheel and the steering post is established or released, as well as the locking mechanism which controls the functioning of the connecting mechanism.

The purpose of providing the encasing armor just referred to is to prevent the use of tools, such as a drill or chisel, upon the mechanism of the steering wheel, which might enable the party using the same to gain access to the locking mechanism and so defeat the purpose of releasing the steering wheel from its steering post. For this purpose the encasing mechanism, which will subsequently be described, is preferably made of a hard resistant metal, such, for instance, as hardened steel.

Reference should be had to the accompanying drawings forming a part of this specification, in which Fig. 1 is a top plan view of a steering wheel embodying the present invention; Fig. 2 is a transverse sectional elevation upon the line 2—2 of Fig. 1; Fig. 3 is a sectional elevation upon the line 3—3 of Fig. 1; Fig. 4 is a sectional elevation of a portion of the steering wheel; Fig. 5 is a sectional view in plane through the hub of the steering wheel and the mechanism associated therewith; Fig. 6 is a perspective view showing a part of the mechanism of the steering wheel; Fig. 7 is a bottom plan view of a cap used with the steering wheel; Fig. 8 is a perspective view showing one element of the armor casing; Fig. 9 is a perspective view showing another member of the armor casing; Fig. 10 is a plan view showing an element of the armor casing before it is completely formed; Fig. 11 is a longitudinal section of the members shown in Fig. 10; Fig. 12 is a perspective view of a member forming a part of the armor casing.

Referring to the drawings, 1 indicates the hub of a steering wheel, and $2^a$ are arms which rotate from the hub, which arms at their outer ends co-operate with a rim $3^a$. The hub of the wheel is hollow and receives the armor casing within which the various parts of the mechanism for attaching or releasing the steering wheel with respect to the steering column are housed.

The armor casing is preferably formed by two cylindrical members, which are particularly shown in Figs. 8 to 11, inclusive, and are designated by the reference characters 3 and 4. The member 3 is preferably made by forming the same from a blank of metal, and, as before indicated, is cylindrical in its configuration and hollow. This member 3 at its upper end has an inwardly extended flange 5. It also is provided with two openings, one indicated at 6 and the other indicated at 7, these openings being for the purpose of receiving extension members 8 and 9, which contain and house certain portions of the operating mechanism for securing the wheel or releasing the same from the steering post. The member 4 is preferably formed by taking a flat blank, such as indicated at 10, and punching through the same an opening 11 and a second opening 12, these openings being adapted to receive certain parts of the hereinafter described mechanism. The blank 10, when punched as described, is then given a circular form, such as indicated in Fig. 9, and the cylindrical member 4 formed thereby is forced under suitable pressure within the cylindrical member 3, so that the two parts 3 and 4 are held together by the frictional engagement induced in forcing them together. The upper part of the cylindrical member 4 fits beneath the flange 5 of the member 3. When the parts are thus assembled, a thread is formed at the upper part of the assembled members, as indicated at 13, and the inner member 4 is recessed, as indicated at 14, for the reception of a ball race member 15. The lower end of the member 4 is also threaded, as indicated at 16, for the reception of a second ball race 17, the function of which ball races will be later described.

When the members 3 and 4 are assembled, as previously described, the openings or holes 6 and 7 are drilled through the same.

The hub 1 of the steering wheel is hollow and the recess is so formed as to receive the combined members 3 and 4 being forced into the hub 1 so that these members are frictionally held within the hub 1 and not removable therefrom.

In one of the arms 2ª a reentrant recess 18 is formed and in a portion of the hub an opening 19 is formed. In inserting the members 3 and 4 within the hub of the wheel, the openings 7 and 6 formed in the aforesaid members are positioned opposite the recess 18 and the opening 19, respectively. Then there are inserted the tubular members 8 and 9 through these openings 7 and 6, so that they occupy, respectively, the recess 18 and the opening 19. These tubular members 8 and 9 are at their inner ends slightly flanged outwardly, as indicated at 8ª in Fig. 12, with respect to the member 8, and the member 9 is similarly formed, and the openings 7 and 6 are also slightly tapered, so that when the members 8 and 9 are inserted they can not pass entirely through the openings 7 and 6. The inner portions of the members 7 and 6 are formed at certain parts with flat sides, which is shown with respect to the member 8 in Fig. 12 and indicated by the reference numeral 8ᵇ. When the members 8 and 9 are inserted through the openings 7 and 6, the parts are so arranged that contiguous flat surfaces of the members 8 and 9 will meet and abut each other, as indicated at 20 in Fig. 5. This will prevent relative rotation between the members 8 and 9 and, if desired, any appropriate method may be employed for securing the members 8 and 9 in position with respect to the members 3 and 4, as by brazing or peening, or any other acceptable method.

A steering post is indicated at 21, and this steering post at its upper end receives a body member 22, which has a central opening, that is keyed or otherwise secured upon the upper end of the steering post, as indicated at 23. The end of the steering post is threaded and receives a nut 24 which holds the member 22 in place. It will be apparent that the member 22 is rotatable with the steering post 21. This member 22 has an opening 25 formed therein, which is adapted to receive a bolt or connecting element 26, which will be later described.

The inner end of the bolt 26 extends through the encasing member 8, while the outer end of this bolt or retaining member extends through an opening 27 which is formed in one of the spokes. The bolt extends to approximately the outer end of the spoke in which it is formed, this bolt at its outer end having a finger engaging member 28, which serves to move the bolt when the operator desires. Within the opening 27 in the arm 2ª a spring 29 is so arranged with respect to the bolt 26 that its tendency is to push the bolt inward and into its engaging position. In order to prevent the bolt 26 from being accidentally pulled outwardly, a spring-pressed stop member 30 is seated in an opening in the arm 2ª adjacent the member 28, and prevents extended movement of the member 28 to withdraw the bolt 26 unless member 30 is purposely depressed. When the bolt 26 is withdrawn, then the wheel is free to spin without affecting the steering post 21.

The bolt 26 is for convenience of assembly formed of two parts, including an enlarged inner part and an outer part which is relatively small, or of smaller diameter. This is made necessary by reason of the fact that the inner enlarged part must be inserted in the part 8 from the inside, the construction precluding its insertion from the outside.

The forming of the bolt 26 in two parts renders necessary a union or connection between them of such a nature that the parts can not be accidentally or otherwise disconnected. An ordinary screw connection would be unsatisfactory in view of the possibility of the inner part unscrewing. We have devised a very satisfactory method of connecting these parts in a manner such that they can not be disconnected. In fact, the longer the wheel is used the more solidly or firmly the parts are connected together. In accordance with this method the inner enlarged part is provided with a socket extending inwardly from its outer end, and the inner end of this socket is enlarged as shown at 26ª. In the enlarged part 26ª there is placed a hardened ball 26ᵇ and the inner end of the outer reduced part of the bolt is recessed with a flare or given a tapered hole. It will be seen, therefore, that it is only necessary to insert the outer part of the bolt into the inner part and drive its inner end solidly against the ball 26ᵇ which causes the flared wall where it engages the ball to be spread outwardly as shown at 26ᶜ. This forms on the inner end of the outer part of the bolt an enlargement which prevents the separation of the parts, and inasmuch as the tighter the outer part is driven against the ball the more firmly it is fastened in place, it is apparent, as above stated, that continued use of the device only more securely fastens these parts together.

The ball race members 15 and 17 are positioned at the upper and lower portions of the member 4, the ball race 15 being frictionally retained in place, while the ball race 17 is threaded on its exterior surface and screwed into place.

Inside of member 4 there is an annular movable member 31, which is shown in Fig. 6. The diameter of this member is such that it may comfortably fit within the member 3. The member 31 has a slot 32 into which is secured an arm member 33 and this arm is provided with an arc-shaped extension 34, around which there is a spring 35, the spring acting to push the member 33 forwardly. The spring 35 and the arm 33 are housed within the recess 11, which is formed by the opening 11 in the member 4 when this member is assembled with respect to the member 3, for it is readily to be seen that a recess is formed of a depth corresponding with the thickness of the metal forming the member 4. This member 31 is also provided with a substantially round hole 36, which is adapted to be brought into registry with the bolt 26 so that the bolt may pass through this opening 36 when the member 31 is properly positioned. The member 31 also has a slot-like opening 37 which is positioned to lie opposite the armor member 9. This slot is positioned to engage with the member 38 by locking cylinder 39, this locking cylinder 39 being one which may be operated by a key. By turning the key in the cylinder 39 the extension 38 may be moved so as to engage with the wheel of the slot 37 to move the member 31.

The normal operation when the bolt 26 extends through the opening 36, the spring 35 is under compression and it remains under compression so long as the bolt 26 occupies the recess 25. When the bolt 26 is withdrawn, then the member 31 under the influence of the spring 35 moves the member 31, so that the opening 36 is out of alignment with the bolt 26 and, therefore, when the bolt is subsequently released it will merely strike against an imperforate part of the member 31, and the wheel proper will remain disconnected from the steering post.

When a proper key is inserted in the lock 39 the member 38 will engage with an edge of the slot 37 and will forcibly push the member 31 against the action of the spring 35 until the hole 36 registers with the bolt 26, and when this takes place the bolt 26 will automatically be pushed through the hole 36 under the action of the spring 29. If at this time the opening 25 in the member 22 is not in position to receive the bolt 26, a slight turning of the wheel will bring these parts into such relative position that the bolt 26 will shoot into the opening 25 and thus make the connection.

In the member 4 there is a recess formed by the opening 12 and in this recess there is mounted a movable member 40. This member at its lower end is wedge-shaped, as indicated at 41, Fig. 6, and it engages with a V-shaped opening formed in the member 31. The member 40 extends inside the inner wheel of the member 4 and is in position to engage with a flattened side, such as indicated at 41$^a$ in Fig. 7, which is formed adjacent the edge of the cap member 42, which is threaded into the outer end of the hub 1 of the steering wheel. The arrangement is such that when the cap 42 is in its innermost position, one of the side members 41$^a$ will be just above the member 40. When the member 31 is in that position, as indicated in Figs. 2 and 5, wherein the bolt 26 is in its engaging position, that is to say, in its engaging position to secure the steering wheel to the steering post, then the member 40 will drop down into the lowest part of the groove which it occupies in the member 31, and when it is down in its lowest position it will not engage with a flat side 41$^a$ of the cap 42 so that under these circumstances the cap 42 may be removed by unscrewing it from the hub 1. When, however, the bolt 26 is withdrawn, the member 31 will rotate and this will cause the member 40 to be pushed upwardly because of the slanting surface engagement between the member 40 and the member 31, and when the member 40 is so pushed up it will engage with a flat side of the member 31 with the cap 42 and so prevent turning of this cap so that access to the locking mechanism can not be had by removal of the cap 42.

The cap 42 has a central opening which receives a horn button 44, which is spring-pressed to hold it in its outward position. This horn button at the inner end thereof is secured to a cup-like member 45 which occupies a recess in the cap 42, and the edge of the member 45 is flanged outwardly, as indicated at 46, this flange bearing upon a plurality of pins, such as indicated at 47. These pins extend downwardly through the member 22 through suitable openings, and at their lower ends engage with the plate 48 which is positioned above a movable contact member 49, which last mentioned contact member is adapted to cooperate with another contact member 50. These contact members 49 and 50 are connected in the circuit which energizes a horn, or other signalling device.

It will be seen that the button 44 and the member 45 are carried by the wheel and rotate with it, while the pins 47 and the plate member 48 and the contact members 49 and 50 are stationary and non-rotatable. The fact that the wheel is disconnected from the steering post does not interfere with the operation of the horn button or its contact making function, because there is a slight connection between the ends of the pins 47 and the member 45.

The members 3 and 4 and the cap member 42 are preferably made of some metal which is difficult to cut or drill, and for this purpose steel may be used, which may be softened and in its softened state machined as desired, and subsequently subjected to a hardening process by which it is made resistant to cutting tools.

By the provision of the armor which has been described, it would be impossible, practically speaking at least, for any one to tamper with the lock by drilling or otherwise cutting away any portion of the hub of the wheel 1 because the armored portion would defy such efforts.

Having described our invention, we claim:—

1. A steering wheel, having a hub portion which is recessed, a cup-shaped member in said recess adapted to receive the steering post, an annular latch member carried by and mounted within the said cup-shaped member and rotatable with respect to said cup-shaped member, means by which the said annular member may be secured to or released from the hub of the steering wheel, and means carried by the hub for locking the same to the steering post, said annular latch member being adapted in one position to restrain the movement of said locking member.

2. A steering wheel, having a hub portion with a recess, a cup-shaped member in said recess adapted to receive the steering post, an annular member carried by and mounted within the said cup-shaped member and rotatable with respect thereto, a bolt which is slidably carried by the said wheel, the said annular member being provided with an opening through which the said bolt may be projected into locking engagement with the steering post.

3. A steering wheel, having a hub which is provided with a recess, a cup-shaped member which occupies the recess, an annular member within the cup-shaped member, the said annular member being rotatable with respect to the cup-shaped member, a bolt slidably mounted upon an arm of said steering wheel, a sleeve extending outwardly from said cup-shaped member and receiving the end of the bolt, said annular member being provided with an opening adapted to receive the bolt, a spring-pressed latch member within the cup-shaped member which is adapted to engage and retain said bolt member when the bolt is withdrawn, and means for operating the latch.

4. A steering wheel having a hub which is provided with a recess, a cup-shaped member which occupies the recess, an annular member within the cup-shaped member, the said annular member being rotatable with respect to the cup-shaped member, a bolt slidably mounted upon an arm of said steering wheel, a sleeve extending outwardly from said cup-shaped member and receiving the end of the bolt, said annular member being provided with an opening adapted to receive the bolt, a spring-pressed latch member within the cup-shaped member which is adapted to engage and retain said bolt member when the bolt is withdrawn, and means for operating the latch, a sleeve-like member extending from the said cup-shaped member which encloses and houses the said means for operating the spring-pressed latch.

5. A steering wheel, having a hub portion with a recess therein, another recess formed in the said hub which communicates with the larger recess, and an opening through the hub which communicates with the said recess, a cup-shaped member within said recess, two sleeve-like members extending through openings in the cup-shaped member and occupying, respectively, the second recess and the opening through the hub of the wheel, an annular member mounted within the cup-shaped member and rotatable with respect thereto, a bolt extending through one of said sleeve-like members, said annular member being provided with an opening with which the bolt co-operates, a spring-pressed latch member within the said cup-shaped member and adapted to engage and retain the bolt in its withdrawn position, and a locking mechanism housed within the other of said sleeve-like members for operating the said latch.

6. A steering wheel, having a hub portion, a recess in said hub portion, a cup-shaped member occupying said recess and secured therein, a cylindrical member within the said cup-shaped member and secured thereto, an annular member within the said cylindrical member and rotatable with respect thereto, and means for connecting and disconnecting the hub with the said annular member.

7. A steering wheel, having a hub portion formed with a recess therein, a cup-shaped member occupying said recess, a cylindrical member within the cup-shaped member and forced into engagement therewith, a sleeve-like member extending through an opening in the said cylindrical member and cup-shaped member, a bolt extending through said sleeve-like member, a second sleeve-like member extending through an opening in the cylindrical member and cup-shaped member, and a locking mechanism housed in said sleeve-like member, an annular member rotatably mounted within the said cylindrical member and adapted to be connected or disconnected with the hub of the steering wheel by operation of the aforesaid bolt.

8. A steering wheel, having a hub portion with a recess therein, a cup-shaped member occupying said recess, a cylindrical member forced into engagement therewith, a bolt slidably mounted with respect to the hub of the steering wheel, an annular member mounted within the said cylindrical member and rotatable with respect thereto, said annular member having an opening adapted to be engaged by the said bolt, an annular latch member within the cylindrical member, a spring for normally urging said latch member in one direction, the said cylindrical member before recited being provided with a recess for housing the said spring, a locking mechanism carried by the hub of the wheel, and an operative connection between the locking member and said latch for operating the same.

9. In combination, a steering wheel, a part to which it is designed to be connected, and a locking bolt for connecting and disconnecting them, said locking bolt being formed in two parts, one received in the other, and means interposed between said members adapted to expand the end of said inner member to prevent disengagement between said members.

10. In combination, a steering wheel, a part to which it is designed to be connected, an endwise movable locking bolt for connecting and disconnecting them, said bolt being formed in two parts including an enlarged inner part having a socket, a reduced outer part extended into the socket, and a ball at the base of the socket, the inner end of the outer part having a tapered hole which by engagement with the ball is expanded to secure the parts together.

In testimony whereof, we hereunto affix our signatures.

ADELBERT E. BRONSON.
EWALD F. TOBOLD.